United States Patent
Hahn et al.

(10) Patent No.: US 12,389,401 B2
(45) Date of Patent: Aug. 12, 2025

(54) METHOD AND APPARATUS FOR TRANSMISSION AND RECEPTION OF SIDELINK CONTROL INFORMATION IN COMMUNICATION SYSTEM

(71) Applicants: Hyundai Motor Company, Seoul (KR); Kia Corporation, Seoul (KR)

(72) Inventors: Gene Back Hahn, Gyeonggi-do (KR); Hyuk Min Son, Jeollabuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 547 days.

(21) Appl. No.: 17/636,638

(22) PCT Filed: Aug. 14, 2020

(86) PCT No.: PCT/KR2020/010883
§ 371 (c)(1),
(2) Date: Feb. 18, 2022

(87) PCT Pub. No.: WO2021/034045
PCT Pub. Date: Feb. 25, 2021

(65) Prior Publication Data
US 2022/0272682 A1    Aug. 25, 2022

Related U.S. Application Data

(60) Provisional application No. 62/889,857, filed on Aug. 21, 2019.

(30) Foreign Application Priority Data

Aug. 12, 2020   (KR) .......................... 10-2020-0101196

(51) Int. Cl.
*H04W 72/20*        (2023.01)

(52) U.S. Cl.
CPC .................................. *H04W 72/20* (2023.01)

(58) Field of Classification Search
CPC ..................................................... H04W 72/20
(Continued)

(56) References Cited

U.S. PATENT DOCUMENTS

2018/0070264 A1 * 3/2018 Saiwai ................. H04W 72/04
2019/0069200 A1    2/2019 Zhang et al.
(Continued)

OTHER PUBLICATIONS

RI-1908579—"Physical Layer Structure for NR Sidelink", 3GPP TSG RAN WG1—Meeting #98, Prague, CZ (Aug. 26-30, 2019).
(Continued)

*Primary Examiner* — Chi Tang P Cheng
(74) *Attorney, Agent, or Firm* — Fox Rothschild LLP

(57) ABSTRACT

A method and apparatus for transmission and reception of sidelink control information in a communication system are disclosed. An operation method of a transmission terminal comprises the steps of: generating first stage SCI including resource allocation information of a plurality of pieces of second stage SCI; transmitting the first stage SCI to one or more reception terminals; and transmitting the plurality of pieces of second stage SCI to the one or more reception terminals in a resource area indicated by the resource allocation information. Therefore, the performance of the communication system can be improved.

17 Claims, 12 Drawing Sheets

(58) Field of Classification Search
USPC .......................................................... 370/329
See application file for complete search history.

(56) References Cited

U.S. PATENT DOCUMENTS

2019/0239112 A1    8/2019  Rao et al.
2020/0260472 A1*   8/2020  Ganesan ................ H04W 4/46

OTHER PUBLICATIONS

R1-1908911—"PHY Layer Structure for NR Sidelink", 3GPP TSG-RAN WG1 Meeting #98, Prague, CZ (Aug. 26-30, 2019).
R1-1909419—"On Physical Layer Structure For NR V2X Sidelink", 3GPP TSG-RAN WG1 Meeting #98, Prague, CZ (Aug. 26-30, 2019).
International Search Report issued Jul. 12, 2020, in corresponding PCT Application No. PCT/KR2020/010883.

* cited by examiner

METHOD AND APPARATUS FOR TRANSMISSION AND RECEPTION OF SIDELINK CONTROL INFORMATION IN COMMUNICATION SYSTEM

CROSS-REFERENCE TO RELATED APPLICATIONS

This application is a U.S. National Stage of International Patent Application No. PCT/KR2020/010883, filed on Aug. 14, 2020 in the Korean Intellectual Property Office. International Patent Application No. PCT/KR2020/010883 claims the benefit of U.S. Provisional Patent Application No. 62/889,857, filed on Aug. 21, 2019 and Korean Application No. KR 2020-0101196, filed on Aug. 12, 2020 in the Korean Intellectual Property Office. The entire contents of each of these applications are incorporated herein by reference.

BACKGROUND

Technical Field

Embodiments of the present disclosure relate to a sidelink communication technique, and more particularly, to a technique for transmitting and receiving sidelink control information.

Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system), as well as the frequency band of the 4G communication system, has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink control information (SCI) may include 1st-stage SCI and 2nd-stage SCI. Each of the 1st-stage SCI and the 2nd-stage SCI may include control information for sidelink communication, and the sidelink communication may be performed based on the control information included in the 1st-stage SCI and/or the 2nd-stage SCI. The sidelink communication may be performed using a plurality of SCIs, and in this case, a resource allocation method (e.g., configuration method) for transmission of the plurality of SCIs is required.

SUMMARY

An objective of embodiments of the present disclosure for solving the above-described problem is to provide a method for configuring sidelink resources for transmitting a plurality of SCIs.

An operation method of a transmitting terminal, according to a first exemplary embodiment of the present disclosure for achieving the objective, may comprise: generating a 1st-stage sidelink control information (SCI) including resource allocation information of a plurality of 2nd-stage SCIs; transmitting the 1st-stage SCI to one or more receiving terminals; and transmitting the plurality of 2nd-stage SCIs to the one or more receiving terminals in resource region(s) indicated by the resource allocation information.

The operation method may further comprise receiving, from a base station, a higher layer message including configuration information of candidate resources capable of transmitting the plurality of 2nd-stage SCIs, wherein the resource region(s) indicated by the resource allocation information is one candidate resource among the candidate resources.

The resource allocation information may include time resource information and frequency resource information for each of the plurality of 2nd-stage SCIs.

The time resource information may indicate at least one of a start symbol index or a number of symbols, and the frequency resource information may indicate at least one of a start resource element (RE) index or a number of REs.

The resource allocation information may include information indicating a time resource and a frequency resource of a 2nd-stage SCI #n among the plurality of 2nd-stage SCIs, a time interval between the plurality of 2nd-stage SCIs, a frequency interval between the plurality of 2nd-stage SCIs, or combinations thereof, and n is a natural number.

The time interval may be a time-domain interval between the time resource of the 2nd-stage SCI #n and a time resource of a 2nd-stage SCI #n+1 among the plurality of 2nd-stage SCIs, and the frequency interval may be a frequency-domain interval between the frequency resource of the 2nd-stage SCI #n and a frequency resource of the 2nd-stage SCI #n+1.

The plurality of 2nd-stage SCIs may be transmitted on different physical sidelink shared channels (PSSCHs) or a same PSSCH.

The 1st-stage SCI may include common control information for the one or more receiving terminals, and the plurality of 2nd-stage SCIs may include dedicated control information for the one or more receiving terminals, respectively.

The plurality of 2nd-stage SCIs may be multiplexed in at least one of a time domain and a frequency domain.

An operation method of a receiving terminal, according to a second exemplary embodiment of the present disclosure for achieving the objective, may comprise: receiving a 1st-stage sidelink control information (SCI) from a transmitting terminal; obtaining resource allocation information of a plurality of 2nd-stage SCIs included in the 1st-stage SCI; and receiving the plurality of 2nd-stage SCIs from the transmitting terminal in resource region(s) indicated by the resource allocation information.

The operation method may further comprise receiving, from a base station, a higher layer message including configuration information of candidate resources capable of transmitting the plurality of 2nd-stage SCIs, wherein the resource region(s) indicated by the resource allocation information may be one candidate resource among the candidate resources.

The 1st-stage SCI may be obtained by performing a blind decoding operation, and the plurality of 2nd-stage SCIs may be obtained without performing a blind decoding operation.

The resource allocation information may include time resource information and frequency resource information for each of the plurality of 2nd-stage SCIs.

The time resource information may indicate at least one of a start symbol index or a number of symbols, and the frequency resource information may indicate at least one of a start resource element (RE) index or a number of REs.

The resource allocation information may include information indicating a time resource and a frequency resource of a 2nd-stage SCI #n among the plurality of 2nd-stage SCIs, a time interval between the plurality of 2nd-stage SCIs, a frequency interval between the plurality of 2nd-stage SCIs, or combinations thereof, and n is a natural number.

The time interval may be a time-domain interval between the time resource of the 2nd-stage SCI #n and a time resource of a 2nd-stage SCI #n+1 among the plurality of 2nd-stage SCIs, and the frequency interval may be a frequency-domain interval between the frequency resource of the 2nd-stage SCI #n and a frequency resource of the 2nd-stage SCI #n+1.

An operation method of a transmitting terminal, according to a third exemplary embodiment of the present disclosure for achieving the objective, may comprise: receiving, from a base station, a higher layer message including sidelink (SL)-physical sidelink control channel (PSCCH) configuration information and SL-physical sidelink shared channel (PSSCH) configuration information; transmitting a 1st-stage sidelink control information (SCI) to the receiving terminal on a PSCCH indicated by the SL-PSCCH configuration information; transmitting a plurality of 2nd-stage SCIs to the receiving terminal on PSSCH(s) indicated by the SL-PSSCH configuration information; and transmitting data to the receiving terminal based on information elements included in the 1st-stage SCI and the plurality of 2nd-stage SCIs.

The SL-PSSCH configuration information may include time resource information and frequency resource information for each of the plurality of 2nd-stage SCIs, the time resource information may indicate at least one of a start symbol index or a number of symbols, and the frequency resource information may indicate at least one of a start resource element (RE) index or a number of REs.

The SL-PSSCH configuration information may include information indicating a time resource and a frequency resource of a 2nd-stage SCI #n among the plurality of 2nd-stage SCIs, a time interval between the plurality of 2nd-stage SCIs, a frequency interval between the plurality of 2nd-stage SCIs, or combinations thereof, the time interval may be a time-domain interval between the time resource of the 2nd-stage SCI #n and a time resource of a 2nd-stage SCI #n+1 among the plurality of 2nd-stage SCIs, and the frequency interval may be a frequency-domain interval between the frequency resource of the 2nd-stage SCI #n and a frequency resource of the 2nd-stage SCI #n+1.

The SL-PSSCH configuration information may include configuration information of candidate resources capable of transmitting the plurality of 2nd-stage SCIs, and the 1st-stage SCI may include information indicating one candidate resource among the candidate resources.

According to embodiments of the present disclosure, a plurality of 2nd-stage SCIs associated with a 1st-stage SCI may be used. The 1st-stage SCI may include resource allocation information of the plurality of 2nd-stage SCIs. The terminal may be configured to identify the resource allocation information of the plurality of 2nd-stage SCIs by receiving the 1st-stage SCI, and may be configured to obtain the plurality of 2nd-stage SCIs from resources indicated by the 1st-stage SCI. The terminal may be configured to perform sidelink communication using information element(s) included in the 1st-stage SCI and/or the plurality of 2nd-stage SCIs. Accordingly, the performance of the communication system can be improved.

DETAILED DESCRIPTION

Figure 1:
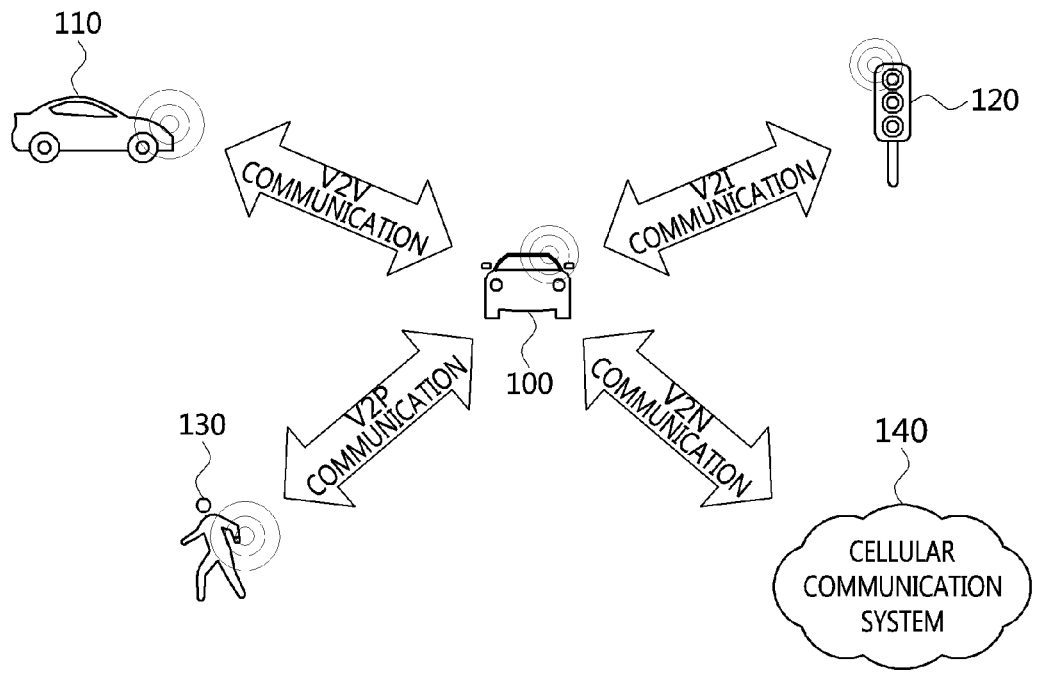
FIG. 1 is a conceptual diagram illustrating V2X communication scenarios.

While embodiments of the present disclosure are susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the embodiments of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the embodiments of the present disclosure, to facilitate the entire understanding, like numbers refer to like elements throughout the description of the figures and the repetitive description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may be configured to generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
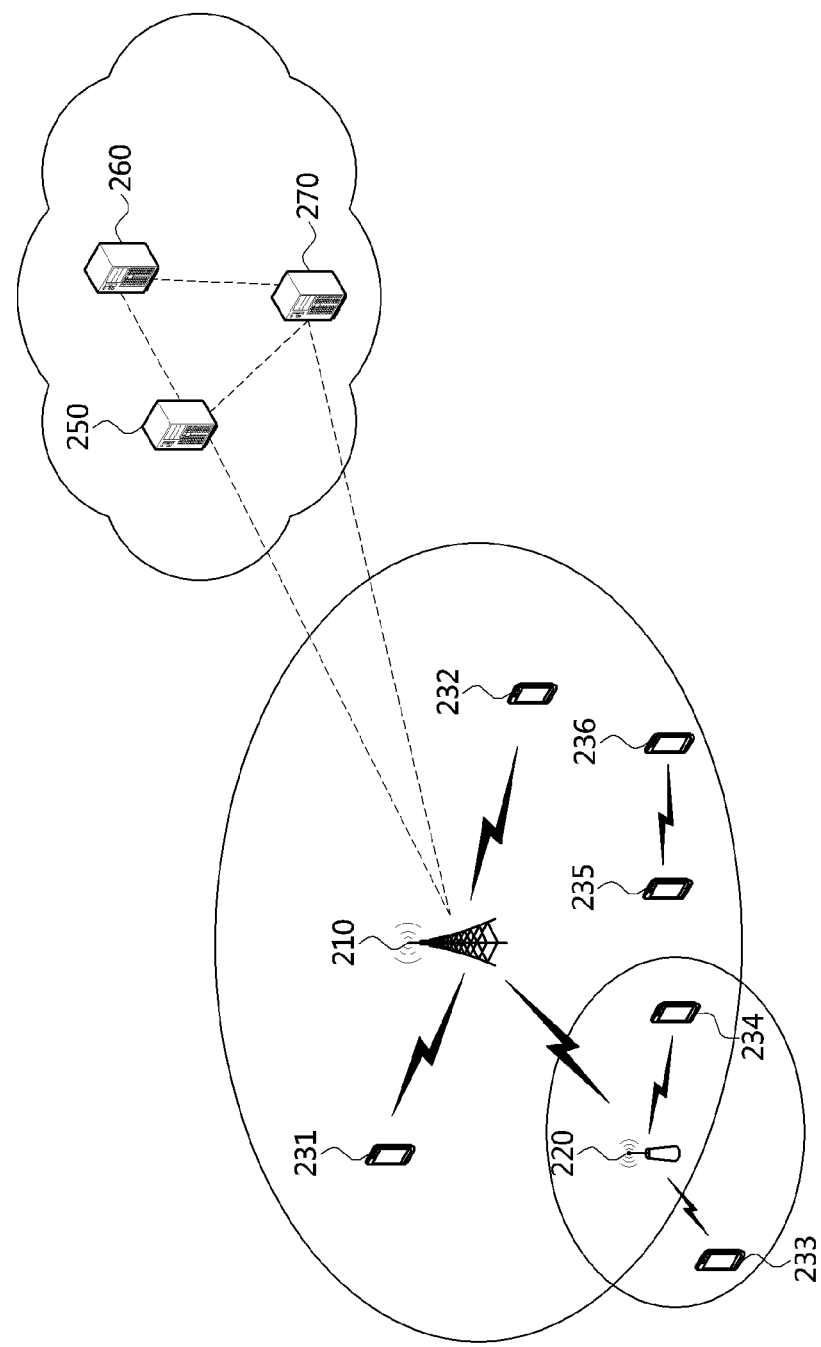
FIG. 2 is a conceptual diagram illustrating an exemplary embodiment of a cellular communication system.

FIG. 2 is a conceptual diagram illustrating an exemplary embodiment of a cellular communication system. As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may be configured to perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
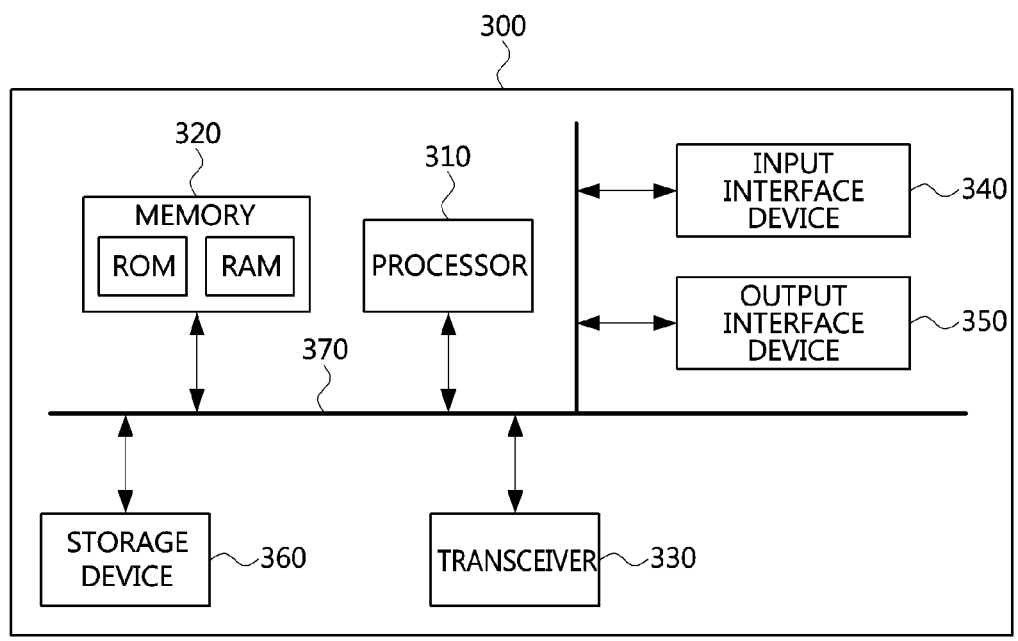
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system. As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may be configured to communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and may be configured to transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may be configured to transmit signals received from the base station 210 to the UEs 233 and 234, and may be configured to transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may be configured to support multiple-input, multiple-output (MIMO) technologies (e.g., single user (SU)-MIMO, multi-user (MU)-

MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
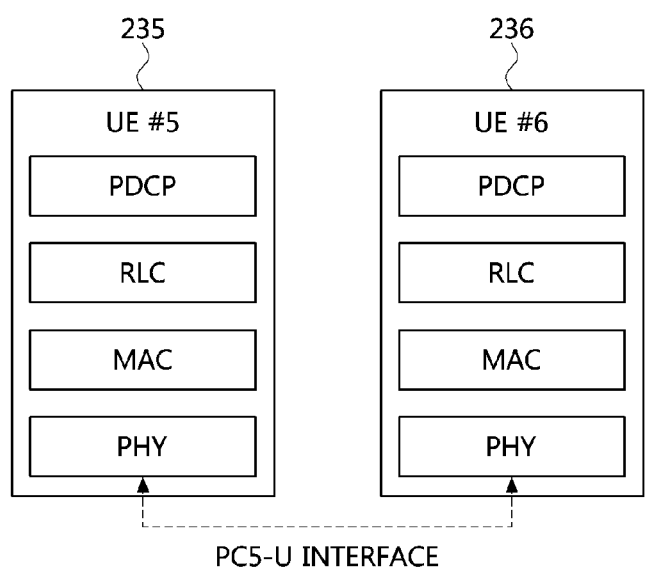
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
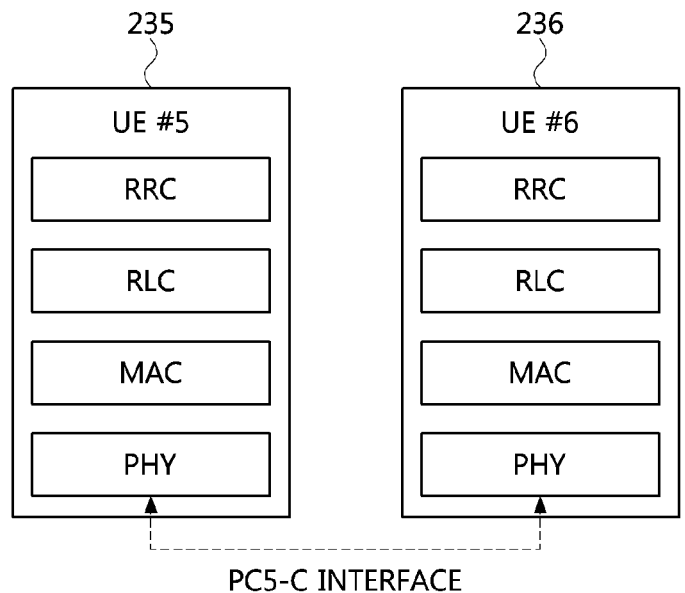
FIG. 5 is a block diagram illustrating a first exemplary embodiment of a control plane protocol stack of a UE performing sidelink communication.
Figure 6:
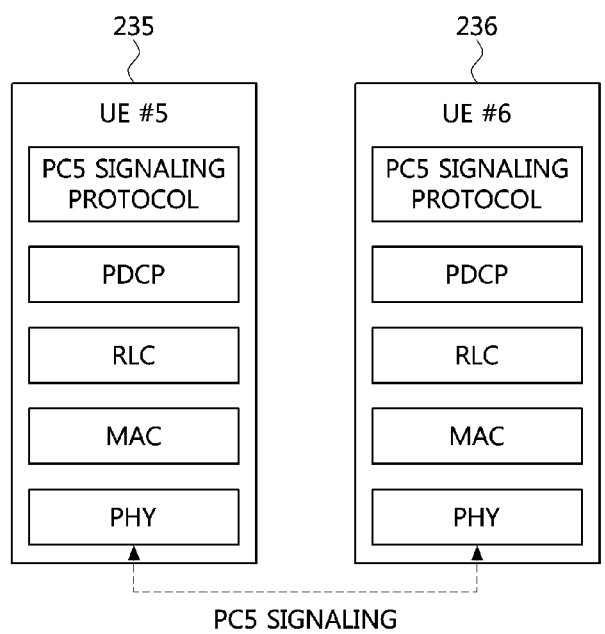
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication. FIG. 6 is a block diagram illustrating a second exemplary embodiment of a control plane protocol stack of a UE performing sidelink communication.

As shown in FIGS. 5 and 6, a left UE may be the UE 235 shown in FIG. 2, and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for configuring sidelink resources will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may be configured to perform an operation corresponding to the operation of the UE #1. Conversely, when an operation of the UE #2 is described, the corresponding UE #1 may be configured to perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, or physical (PHY) signaling. A message used for higher layer signaling may be referred to as a 'higher layer message' or "higher layer signaling message." A message used for MAC signaling may be referred to as a "MAC message" or "MAC signaling message." A message used for PHY signaling may be referred to as a "PHY message" or "PHY signaling message." The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

In exemplary embodiments, sidelink communication methods between a transmitting terminal and a receiving terminal will be described. The transmitting terminal may refer to a terminal transmitting data (e.g., sidelink data), and the receiving terminal may refer to a terminal receiving the data.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as "first-stage SCI," and the 2nd-stage SCI may be referred to as "second-stage SCI."

The 1st-stage SCI may include one or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Figure 7:
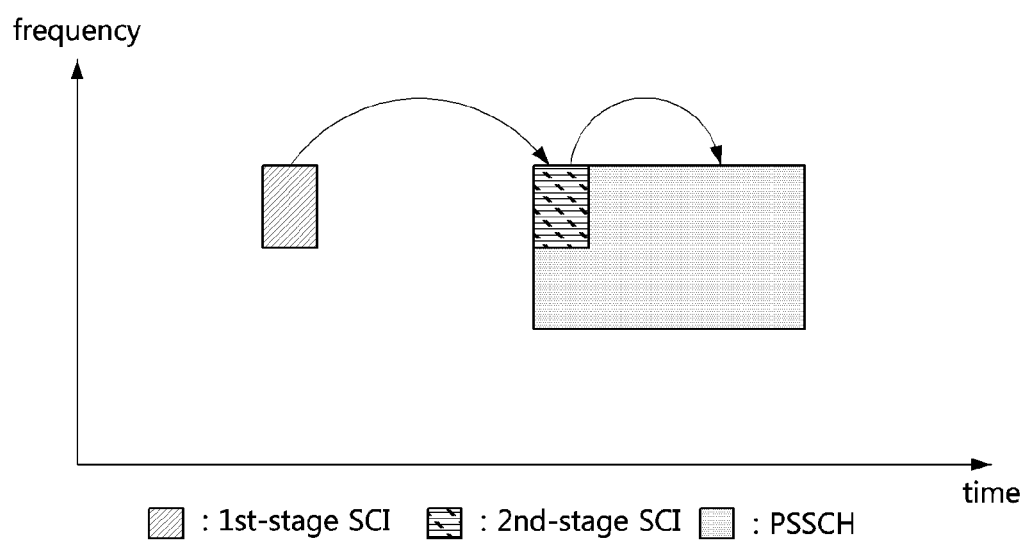
FIG. 7 is a conceptual diagram illustrating a first exemplary embodiment of a sidelink communication method.

FIG. 7 is a conceptual diagram illustrating a first exemplary embodiment of a sidelink communication method. As shown in FIG. 7, sidelink communication may be performed between a transmitting terminal and a receiving terminal. The transmitting terminal may be configured to generate a 1st-stage SCI, and may be configured to transmit the 1st-stage SCI to the receiving terminal. The 1st-stage SCI may be transmitted through a PSCCH occasion. The PSCCH occasion may be configured by higher layer signaling. The PSCCH occasion may be configured by cell-specific signaling, resource pool-specific signaling, UE-specific signaling, or sidelink (SL)-specific signaling. The PSCCH occasion may be a resource region in which the SCI (e.g., 1st-stage SCI and/or 2nd-stage SCI) can be transmitted. Thus, the SCI may be transmitted in resources within the PSCCH occasion. Alternatively, the SCI may not be transmitted in resources within the PSCCH occasion.

The 1st-stage SCI may include resource allocation information of the 2nd-stage SCI. When the 2nd-stage SCI is transmitted on a PSSCH, the resource allocation information included in the 1st-stage SCI may indicate resources in which the 2nd-stage SCI is transmitted within the PSSCH (e.g., PSSCH occasion). Alternatively, when the 2nd-stage SCI is transmitted on a PSCCH, the resource allocation information included in the 1st-stage SCI may indicate resources in which the 2nd-stage SCI is transmitted within the PSCCH (e.g., PSCCH occasion). The resource allocation information of the 2nd-stage SCI may include information element(s) defined in Table 3 below.

TABLE 3

| Information element | Description |
| --- | --- |
| Number of REs | The number of resource elements (REs) may indicate a frequency region in which the 2nd-stage SCI is transmitted within a PSSCH (or, PSCCH or resource pool). |
| Frequency offset | The frequency offset may be an offset between a specific frequency point and a start RE or an end RE of a frequency region in which the 2nd-stage SCI is transmitted. Alternatively, the frequency offset may indicate a start RE index or an end RE index of the frequency region in which the 2nd-stage SCI is transmitted. |
| Number of symbols | The number of symbols may indicate a time region in which the 2nd-stage SCI is transmitted within a PSSCH (or, PSCCH or resource pool). |
| Time offset | The time offset may be an offset between a specific time point and a start symbol or an end symbol of a time region in which the 2nd-stage SCI is transmitted. Alternatively, the time offset may indicate a start symbol index or an end symbol index of the time region in which the 2nd-stage SCI is transmitted. |

The specific frequency point may be a start RE or an end RE of a PSSCH (or, PSCCH or resource pool). The start RE may be an RE having the lowest frequency among REs constituting the frequency region, and the end RE may be an RE having the highest frequency among the REs constituting the frequency region. The specific time point may be a start symbol or an end symbol of a PSSCH (or, PSCCH or resource pool). The start symbol may be the first symbol among symbols constituting the time region, and the end symbol may be the last symbol among the symbols constituting the time region. The information element(s) defined in Table 3 may be indicated by one or a combination of two or more of higher layer signaling, MAC signaling, and PHY signaling. For example, some information element(s) defined in Table 3 may be indicated by higher layer signaling, and the remaining information element(s) defined in Table 3 may be indicated by PHY signaling.

In order to indicate the frequency region in which the 2nd-stage SCI is transmitted, the number of PRBs, the number of subchannels, the number of RB sets, PRB index(es), subchannel index(es), RB set index(es), and/or RE index(es) may be used instead of the number of REs in Table 3. Each of the subchannel and the RB set may include one or more PRBs. In order to indicate the time region in which the 2nd-stage SCI is transmitted, the number of slots, the number of subframes, slot index(es), subframe index(es), and/or symbol index(es) may be used instead of the number of symbols in Table 3.

The resource region in which the 2nd-stage SCI is transmitted may be explicitly or implicitly indicated based on the resource region (e.g., time resource position and/or frequency resource position) in which the 1st-stage SCI is transmitted. A part of the resource region or the entire resource region in which the 2nd-stage SCI is transmitted may be fixed. In this case, the 2nd-stage SCI may be transmitted in a preconfigured resource region, and a transmission operation of the 2nd-stage SCI may be performed according to a cell-specific scheme or a resource pool-specific scheme.

In addition, the 1st-stage SCI may include resource allocation information of a PSSCH. Alternatively, resource allocation information of a PSSCH may be included in the 2nd-stage SCI instead of the 1st-stage SCI. The resource allocation information of a PSSCH included in the 1st-stage SCI and/or the 2nd-stage SCI may indicate a PSSCH on which data is transmitted.

The receiving terminal may be configured to obtain the 1st-stage SCI by performing a monitoring operation (e.g., blind decoding operation) on a PSCCH occasion, and may be configured to identify information element(s) included in the 1st-stage SCI. For example, the receiving terminal may identify the resource allocation information of the 2nd-stage SCI included in the 1st-stage SCI. In addition, the receiving terminal may identify the resource allocation information of the PSSCH included in the 1st-stage SCI.

Meanwhile, the transmitting terminal may be configured to generate the 2nd-stage SCI, and may be configured to transmit the 2nd-stage SCI to the receiving terminal. The 2nd-stage SCI may be transmitted in resources (e.g., resources within PSCCH or PSSCH) indicated by resource allocation information indicated by in the transmitting terminal. Here, the 2nd-stage SCI may include resource allocation information of a PSSCH. In addition, the transmitting terminal may be configured to transmit data to the receiving terminal in resources (e.g., resources within the PSSCH) indicated by the 1st-stage SCI and/or the 2nd-stage SCI.

The receiving terminal may be configured to obtain the 2nd-stage SCI from the resources indicated by the 1st-stage SCI, and may identify the information element(s) included in the 2nd-stage SCI. For example, the receiving terminal may identify the resource allocation information of the PSSCH included in the 2nd-stage SCI. Since the resources in which the 2nd-stage SCI is transmitted are indicated by the resource allocation information included in the 1st-stage SCI, the receiving terminal may be configured to obtain the 2nd-stage SCI without performing a blind decoding operation. The receiving terminal may be configured to receive the data on the PSSCH indicated by the resource allocation information included in the 1st-stage SCI and/or the 2nd-stage SCI. The 2nd-stage SCI may be used for a purpose other than a purpose of providing information for decoding the PSSCH (e.g., data). In this case, the 2nd-stage SCI may be used in a standalone form.

Meanwhile, the 1st-stage SCI may include resource allocation information of up to n 2nd-stage SCIs. That is, the 1st-stage SCI may indicate a maximum of n 2nd-stage SCIs. Here, n may be a natural number. n may be predefined in a technical specification. Alternatively, n may be set by higher layer signaling. For example, n may be set by cell-specific signaling, resource pool-specific signaling, UE-specific signaling, or SL-specific signaling. "n is set by cell-specific signaling" may mean "n is independently configured for each cell." "n is set by resource pool-specific signaling" may mean "n is independently configured for each resource pool." "n is set by UE-specific signaling" may mean "n is independently configured for each terminal." "n is set by SL-specific signaling" may mean "n is configured independently for each sidelink communication."

Figure 8:
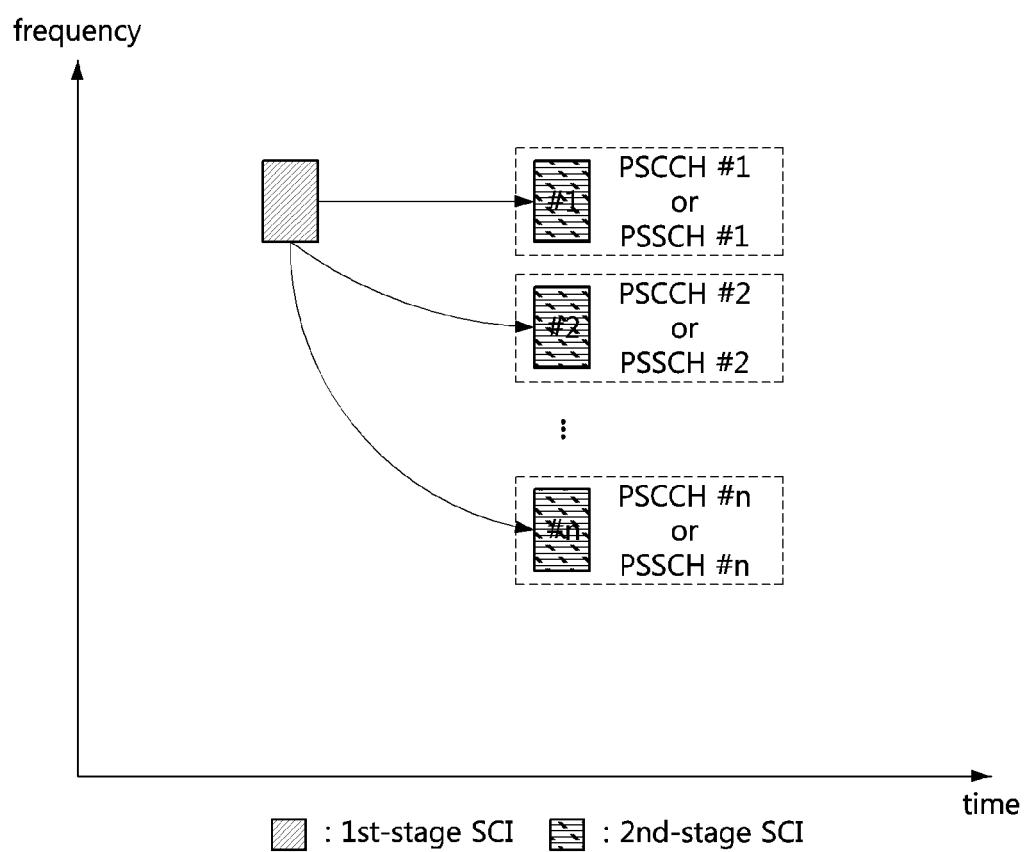
FIG. 8 is a conceptual diagram illustrating a second exemplary embodiment of a sidelink communication method.

FIG. 8 is a conceptual diagram illustrating a second exemplary embodiment of a sidelink communication method. As shown in FIG. 8, sidelink communication may be performed using one 1st-stage SCI and n 2nd-stage SCIs. The n 2nd-stage SCIs may be indicated by the 1st-stage SCI. The n 2nd-stage SCIs may be transmitted in different frequency regions (e.g., different subchannels or RB sets) within the same time region (e.g., the same slot). n may be a natural number. The one 1st-stage SCI may include common control information for a plurality of terminals, and the n 2nd-stage SCIs may include dedicated control information for n terminals, respectively. Alternatively, the one 1st-stage SCI and the n 2nd-stage SCIs may include control information for one terminal.

The transmitting terminal may be configured to generate the 1st-stage SCI and may be configured to transmit the 1st-stage SCI. The 1st-stage SCI may be transmitted through a PSCCH occasion. The PSCCH occasion may be configured by higher layer signaling. The PSCCH occasion may be configured by cell-specific signaling, resource pool-specific signaling, UE-specific signaling, or SL-specific signaling. The PSCCH occasion may be a resource region in which the SCI (e.g., 1st-stage SCI and/or 2nd-stage SCI) can be transmitted. Thus, the SCI may be transmitted in resources within the PSCCH occasion. Alternatively, the SCI may not be transmitted in resources within the PSCCH occasion.

The 1st-stage SCI may include resource allocation information of the n 2nd-stage SCIs. When the n 2nd-stage SCIs are transmitted on PSSCH(s), resource allocation information included in the 1st-stage SCI may indicate resources in which the n 2nd-stage SCIs are transmitted within the PSSCH(s). Alternatively, when the n 2nd-stage SCIs are transmitted on PSCCH(s), the resource allocation information included in the 1st-stage SCI may indicate resources in which the n 2nd-stage SCIs are transmitted within the PSCCH(s).

For example, the 1st-stage SCI may include resource allocation information #1 of a 2nd-stage SCI #1, resource allocation information #2 of a 2nd-stage SCI #2, . . . , and resource allocation information #n of a 2nd-stage SCI #n. Each of the resource allocation information #1 to #n may include the information element(s) defined in Table 3. When a frequency region in which the 2nd-stage SCI #1 is transmitted is configured to be the same as the frequency region in which the 1st-stage SCI is transmitted, the resource allocation information #1 may not include the number of REs and the frequency offset.

Alternatively, the 1st-stage SCI may include the resource allocation information #1 of the 2nd-stage SCI #1 (e.g., the information element(s) defined in Table 3) and information element(s) defined in Table 4 below. The information element(s) defined in Table 4 below may be used to indicate resources of the remaining 2nd-stage SCIs excluding a 2nd-stage SCI #m among the n 2nd-stage SCIs. m may be one natural number from 1 to n.

TABLE 4

| Information element | Description |
| --- | --- |
| Number of 2nd-stage SCIs | The number of 2nd-stage SCIs may indicate the number (e.g., maximum number) of 2nd-stage SCIs indicated by the 1st-stage SCI. The number of 2nd-stage SCIs may be n. |
| Frequency interval | The frequency interval may indicate an interval between 2nd-stage SCIs in the frequency domain. |

The frequency interval may be an interval between a start RE (or start PRB) of a frequency region #m in which the 2nd-stage SCI #m is transmitted and a start RE (or start PRB) of a frequency region #m+1 in which a 2nd-stage SCI #m+1 is transmitted. Alternatively, the frequency interval may be an interval between the start RE (or start PRB) of the frequency region #m and an end RE (or end PRB) of the frequency region #m+1, an interval between an end RE (or end PRB) of the frequency region #m and the end RE (or end PRB) of the frequency region #m+1, or an interval between the end RE (or end PRB) of the frequency region #m and the start RE (or start PRB) of the frequency region #m+1. The information element(s) defined in Table 4 may be indicated by one or a combination of two or more of higher layer signaling, MAC signaling, and PHY signaling. For example, some information element(s) defined in Table 4 may be indicated by higher layer signaling, and the remaining information element(s) defined in Table 4 may be indicated by PHY signaling.

The resource regions in which the n 2nd-stage SCIs are transmitted may be explicitly or implicitly indicated based on the resource region (e.g., time resource position and/or frequency resource position) in which the 1st-stage SCI is transmitted. Some or all of the resource regions in which the n 2nd-stage SCIs are transmitted may be fixed. In this case, the n 2nd-stage SCIs may be transmitted in preconfigured resource regions, and a transmission operation of the n 2nd-stage SCIs may be performed according to a cell-specific scheme or a resource pool-specific scheme.

In addition, the 1st-stage SCI may include resource allocation information of PSSCH(s) (e.g., resource allocation information of n PSSCHs). Alternatively, the resource allocation information of PSSCH(s) may be included in then 2nd-stage SCIs instead of the 1st-stage SCI. The resource allocation information included in the 1st-stage SCI and/or n 2nd-stage SCIs may indicate PSSCH(s) on which data is transmitted.

The receiving terminal(s) may be configured to obtain the 1st-stage SCI by performing a monitoring operation (e.g., blind decoding operation) on the PSCCH occasion, and may identify the information element(s) included in the 1st-stage SCI. For example, the receiving terminal(s) may identify resource allocation information (e.g., information element(s) defined in Table 3 and/or Table 4) of the n 2nd-stage SCIs included in the 1st-stage SCI. In addition, the receiving terminal(s) may identify resource allocation information of PSSCH(s) (e.g., resource allocation information of n PSSCHs) included in the 1st-stage SCI.

Meanwhile, the transmitting terminal may be configured to generate the n 2nd-stage SCIs, and may be configured to transmit the n 2nd-stage SCIs to the receiving terminal(s). The n 2nd-stage SCIs may be transmitted on different PSCCHs or different PSSCHs. The n 2nd-stage SCIs may be transmitted in resources (e.g., resources within PSCCH(s) or PSSCH(s)) indicated by the resource allocation information included in the 1st-stage SCI. Here, the n 2nd-stage SCIs may include resource allocation information of PSSCH(s). In addition, the transmitting terminal may be configured to transmit data to the receiving terminal(s) in resources (e.g., resources within PSSCH(s)) indicated by the 1st-stage SCI and/or the n 2nd-stage SCIs.

The receiving terminal(s) may be configured to obtain the 2nd-stage SCI(s) from the resources indicated by the 1st-stage SCI, and may identify information element(s) included in the 2nd-stage SCI(s). For example, the receiving terminal(s) may identify the resource allocation information of PSSCH(s) included in the 2nd-stage SCI(s). Since the resources in which the 2nd-stage SCI(s) are transmitted are indicated by the resource allocation information included in the 1st-stage SCI, the receiving terminal(s) may be configured to obtain the 2nd-stage SCI(s) without performing a blind decoding operation. The receiving terminal(s) may be configured to receive data on the PSSCH(s) indicated by the resource allocation information included in the 1st-stage SCI and/or the 2nd-stage SCI(s).

Figure 9:
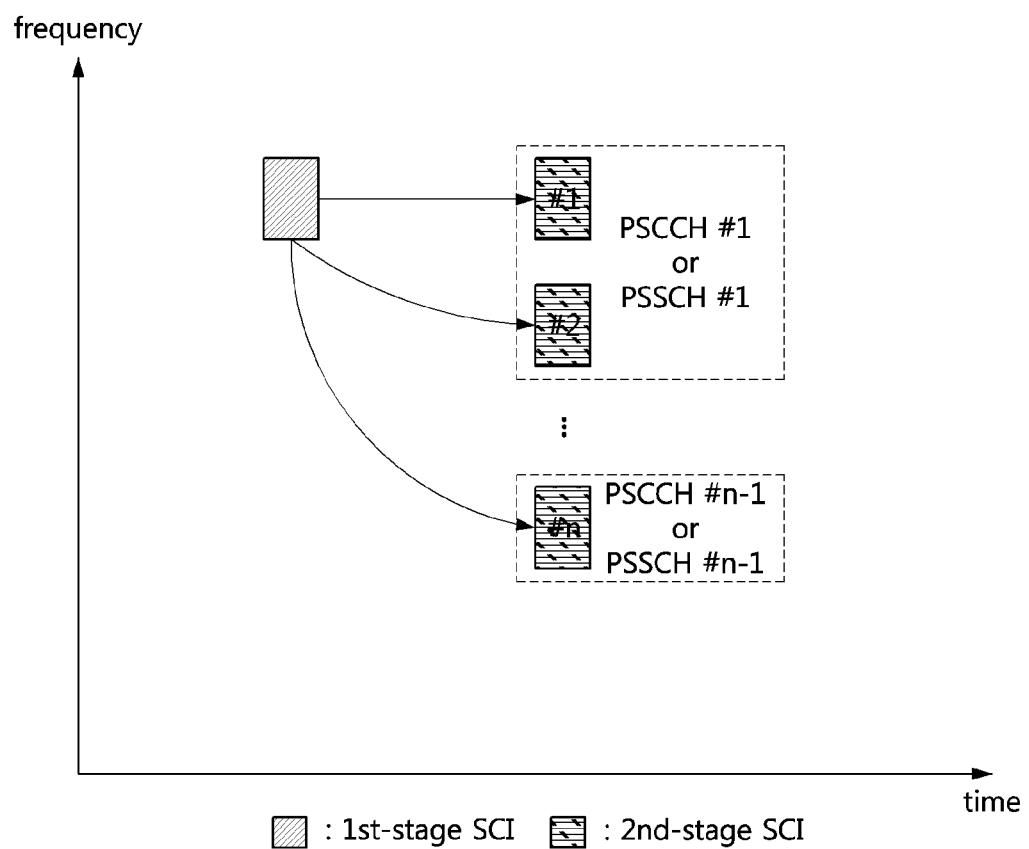
FIG. 9 is a conceptual diagram illustrating a third exemplary embodiment of a sidelink communication method.

FIG. 9 is a conceptual diagram illustrating a third exemplary embodiment of a sidelink communication method. As shown in FIG. 9, sidelink communication may be performed using one 1st-stage SCI and n 2nd-stage SCIs. The n 2nd-stage SCIs may be indicated by the 1st-stage SCI. The n 2nd-stage SCIs may be transmitted in different frequency regions (e.g., different subchannels or different RB sets) within the same time region (e.g., the same slot). A plurality of 2nd-stage SCIs among the n 2nd-stage SCIs may be transmitted on the same PSCCH or the same PSSCH. For example, 2nd-stage SCIs #1 and #2 may be transmitted on a PSCCH #1 or PSSCH #1. In order to support this operation, the 1st-stage SCI may include information element(s) defined in Table 5 below. That is, the 1st-stage SCI may further include the information element(s) defined in Table 3 and/or Table 4 as well as the information element(s) defined in Table 5 below.

TABLE 5

| Information element | Description |
|---|---|
| Multi-PSSCH index (or, multi-PSCCH index) | The multi-PSSCH index (or, multi-PSCCH index) may indicate an index of a PSSCH (or, an index of a PSCCH) on which a plurality of 2nd-stage SCIs are transmitted. |
| Multi-2nd-stage SCI index | The multi-2nd-stage SCI index may indicate indexes of a plurality of 2nd-stage SCIs transmitted on a PSSCH (or, PSCCH) indicated by the multi-PSSCH index (or, multi-PSCCH index). |

The multi-PSSCH index (or multi-PSCCH index) included in the 1st-stage SCI may indicate the PSSCH #1 (or PSCCH #1), and the multi-PSSCH index included in the 1st-stag SCI may indicate the 2nd-stage SCIs #1 and #2. The information element(s) defined in Table 5 may be indicated by one or a combination of two or more of higher layer signaling, MAC signaling, and PHY signaling. For example, some information element(s) defined in Table 5 may be indicated by higher layer signaling, and the remaining information element(s) defined in Table 5 may be indicated by PHY signaling.

In addition, the 1st-stage SCI may include resource allocation information of PSSCH(s) (e.g., resource allocation information of n PSSCHs). Alternatively, the resource allocation information of PSSCH(s) may be included in then 2nd-stage SCIs instead of the 1st-stage SCI. The resource allocation information included in the 1st-stage SCI or the n 2nd-stage SCIs may indicate PSSCH(s) on which data is transmitted.

The receiving terminal(s) may be configured to obtain the 1st-stage SCI by performing a monitoring operation (e.g., blind decoding operation) on the PSCCH occasion, and may be configured to identify the information element(s) included in the 1st-stage SCI. For example, the receiving terminal(s) may identify the resource allocation information (e.g., the information element(s) defined in Table 3, Table 4, and/or Table 5) of the n 2nd-stage SCIs included in the 1st-stage SCI. In addition, the receiving terminal(s) may identify the resource allocation information of PSSCH(s) (e.g., resource allocation information of n PSSCHs) included in the 1st-stage SCI.

Meanwhile, the transmitting terminal may be configured to generate the n 2nd-stage SCIs, and may be configured to transmit the n 2nd-stage SCIs to the receiving terminal(s). The n 2nd-stage SCIs may be transmitted in resources (e.g., resources within PSCCH(s) or PSSCH(s)) indicated by the resource allocation information included in the 1st-stage SCI. A plurality of 2nd-stage SCIs may be transmitted on the same PSSCH or PSCCH. For example, the transmitting terminal may be configured to transmit the 2nd-stage SCIs #1 and #2 on the PSSCH #1 or PSCCH #1. Here, then 2nd-stage SCIs may include resource allocation information of PSSCH(s). In addition, the transmitting terminal may be configured to transmit data to the receiving terminal(s) in resources (e.g., resources within the PSSCH) indicated by the 1st-stage SCI and/or the n 2nd-stage SCIs.

The receiving terminal(s) may be configured to obtain the 2nd-stage SCI(s) in the resources indicated by the 1st-stage SCI. For example, the receiving terminal(s) may be configured to obtain the 2nd-stage SCIs #1 and #2 on the PSSCH #1 or PSCCH #1, and may be configured to obtain a 2nd-stage SCI #n on a PSSCH #n−1 or PSCCH #n−1. The receiving terminal(s) may identify the information element(s) (e.g., resource allocation information of PSSCH(s)) included in the 2nd-stage SCI(s). Since the resources in which the 2nd-stage SCI(s) are transmitted are indicated by the resource allocation information included in the 1st-stage SCI, the receiving terminal(s) may be configured to obtain the 2nd-stage SCI(s) without performing a blind decoding operation. The receiving terminal(s) may be configured to receive data on the PSSCH(s) indicated by the resource allocation information included in the 1st-stage SCI and/or the 2nd-stage SCI(s).

Figure 10:
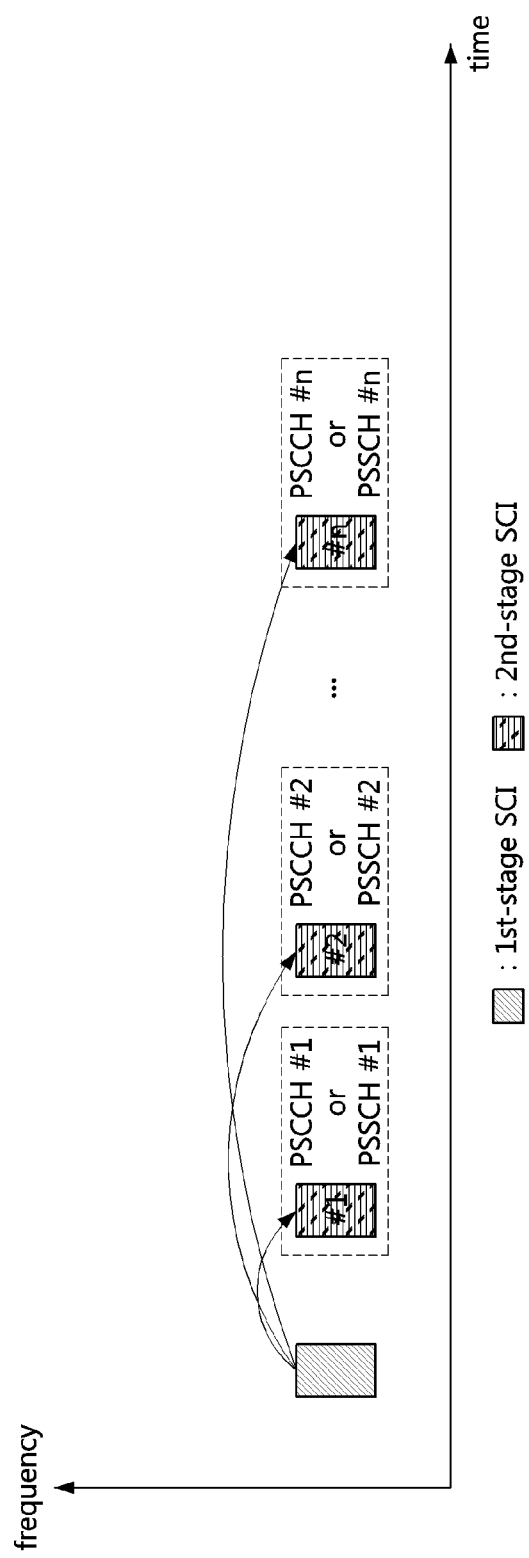
FIG. 10 is a conceptual diagram illustrating a fourth exemplary embodiment of a sidelink communication method.

FIG. 10 is a conceptual diagram illustrating a fourth exemplary embodiment of a sidelink communication method. As shown in FIG. 10, sidelink communication may be performed using one 1st-stage SCI and n 2nd-stage SCIs. The n 2nd-stage SCIs may be indicated by the 1st-stage SCI. The n 2nd-stage SCIs may be transmitted in different time regions within the same frequency region. When each of the PSCCH and the PSSCH is configured on a slot basis, then 2nd-stage SCIs may be transmitted in different slots within the same frequency region. n may be a natural number. The one 1st-stage SCI may include common control information for a plurality of terminals, and the n 2nd-stage SCIs may include dedicated control information for n terminals, respectively. Alternatively, the one 1st-stage SCI and the n 2nd-stage SCIs may include control information for one terminal.

The transmitting terminal may be configured to generate the 1st-stage SCI and may be configured to transmit the 1st-stage SCI. The 1st-stage SCI may be transmitted through a PSCCH occasion. The PSCCH occasion may be configured by higher layer signaling. The PSCCH occasion may be configured by cell-specific signaling, resource pool-specific signaling, UE-specific signaling, or SL-specific signaling. The PSCCH occasion may be a resource region in which the SCI (e.g., 1st-stage SCI and/or 2nd-stage SCI) can be transmitted. Thus, the SCI may be transmitted in resources within the PSCCH occasion. Alternatively, the SCI may not be transmitted in resources within the PSCCH occasion.

The 1st-stage SCI may include resource allocation information of n 2nd-stage SCIs. When the n 2nd-stage SCIs are transmitted on PSSCH(s), the resource allocation information included in the 1st-stage SCI may indicate resources in which the n 2nd-stage SCIs are transmitted within the PSSCH(s). Alternatively, when the n 2nd-stage SCIs are transmitted on PSCCH(s), the resource allocation information included in the 1st-stage SCI may indicate resources in which then 2nd-stage SCIs are transmitted within the PSCCH(s).

For example, the 1st-stage SCI may include resource allocation information #1 of a 2nd-stage SCI #1, resource allocation information #2 of a 2nd-stage SCI #2, . . . , and resource allocation information #n of a 2nd-stage SCI #n. Each of the resource allocation information #1 to #n may include the information element(s) defined in Table 3. When a frequency region in which the 2nd-stage SCIs #1 to #n are transmitted is configured to be the same as the frequency region in which the 1st-stage SCI is transmitted, the resource allocation information #1 to #n may not include the number of REs and the frequency offset.

Alternatively, the 1st-stage SCI may include the resource allocation information #1 of the 2nd-stage SCI #1 (e.g., information element(s) defined in Table 3) and information element(s) defined in Table 6 below. The information element(s) defined in Table 6 below may be used to indicate resources of the remaining 2nd-stage SCIs excluding a 2nd-stage SCI #m among the n 2nd-stage SCIs. m may be one natural number from 1 to n.

TABLE 6

| Information element | Description |
| --- | --- |
| Number of 2nd-stage SCIs | The number of 2nd-stage SCIs may indicate the number (e.g., maximum number) of 2nd-stage SCIs indicated by the 1st-stage SCI. The number of 2nd-stage SCIs may be n. |
| Time interval | The time interval may indicate an interval between 2nd-stage SCIs in the time domain. |

The time interval may be an interval between a start symbol of a time region #m in which the 2nd-stage SCI #m is transmitted and a start symbol of a time region #m+1 in which a 2nd-stage SCI #m+1 is transmitted. Alternatively, the time interval may be an interval between the start symbol of the time region #m and an end symbol of the time region #m+1, an interval between an end symbol of the time region #m and the end symbol of the time region #m+1, or an interval between the end symbol of the time region #m and the start symbol of the time region #m+1. The information element(s) defined in Table 6 may be indicated by one or a combination of two or more of higher layer signaling, MAC signaling, and PHY signaling. For example, some information element(s) defined in Table 6 may be indicated by higher layer signaling, and the remaining information element(s) defined in Table 6 may be indicated by PHY signaling.

The resource regions in which the n 2nd-stage SCIs are transmitted may be explicitly or implicitly indicated based on the resource region (e.g., time resource position and/or frequency resource position) in which the 1st-stage SCI is transmitted. Some or all of the resource regions in which the n 2nd-stage SCIs are transmitted may be fixed. In this case, the n 2nd-stage SCIs may be transmitted in preconfigured resource regions, and a transmission operation of the n 2nd-stage SCIs may be performed according to a cell-specific scheme or a resource pool-specific scheme.

In addition, the 1st-stage SCI may include resource allocation information of PSSCH(s) (e.g., resource allocation information of n PSSCHs). Alternatively, the resource allocation information of PSSCH(s) may be included in then 2nd-stage SCIs instead of the 1st-stage SCI. The resource allocation information included in the 1st-stage SCI and/or n 2nd-stage SCIs may indicate PSSCH(s) on which data is transmitted. The receiving terminal(s) may be configured to obtain the 1st-stage SCI by performing a monitoring operation (e.g., blind decoding operation) on the PSCCH occasion, and may identify the information element(s) included in the 1st-stage SCI. For example, the receiving terminal(s) may identify resource allocation information (e.g., information element(s) defined in Table 3 and/or Table 6) of the n 2nd-stage SCIs included in the 1st-stage SCI. In addition, the receiving terminal(s) may identify resource allocation information of PSSCH(s) (e.g., resource allocation information of n PSSCHs) included in the 1st-stage SCI.

Meanwhile, the transmitting terminal may be configured to generate the n 2nd-stage SCIs, and may be configured to transmit the n 2nd-stage SCIs to the receiving terminal(s). The n 2nd-stage SCIs may be transmitted on different PSCCHs or different PSSCHs. The n 2nd-stage SCIs may be transmitted in resources (e.g., resources within PSCCH(s) or PSSCH(s)) indicated by the resource allocation information included in the 1st-stage SCI. Here, the n 2nd-stage SCIs may include resource allocation information of PSSCH(s). In addition, the transmitting terminal may be configured to transmit data to the receiving terminal(s) in resources (e.g., resources within PSSCH(s)) indicated by the 1st-stage SCI and/or the n 2nd-stage SCIs.

The receiving terminal(s) may be configured to obtain the 2nd-stage SCI(s) from the resources indicated by the 1st-stage SCI, and may identify information element(s) included in the 2nd-stage SCI(s). For example, the receiving terminal(s) may identify the resource allocation information of PSSCH(s) included in the 2nd-stage SCI(s). Since the resources in which the 2nd-stage SCI(s) are transmitted are indicated by the resource allocation information included in the 1st-stage SCI, the receiving terminal(s) may be configured to obtain the 2nd-stage SCI(s) without performing a blind decoding operation. The receiving terminal(s) may be configured to receive data on the PSSCH(s) indicated by the resource allocation information included in the 1st-stage SCI and/or the 2nd-stage SCI(s).

Figure 11:
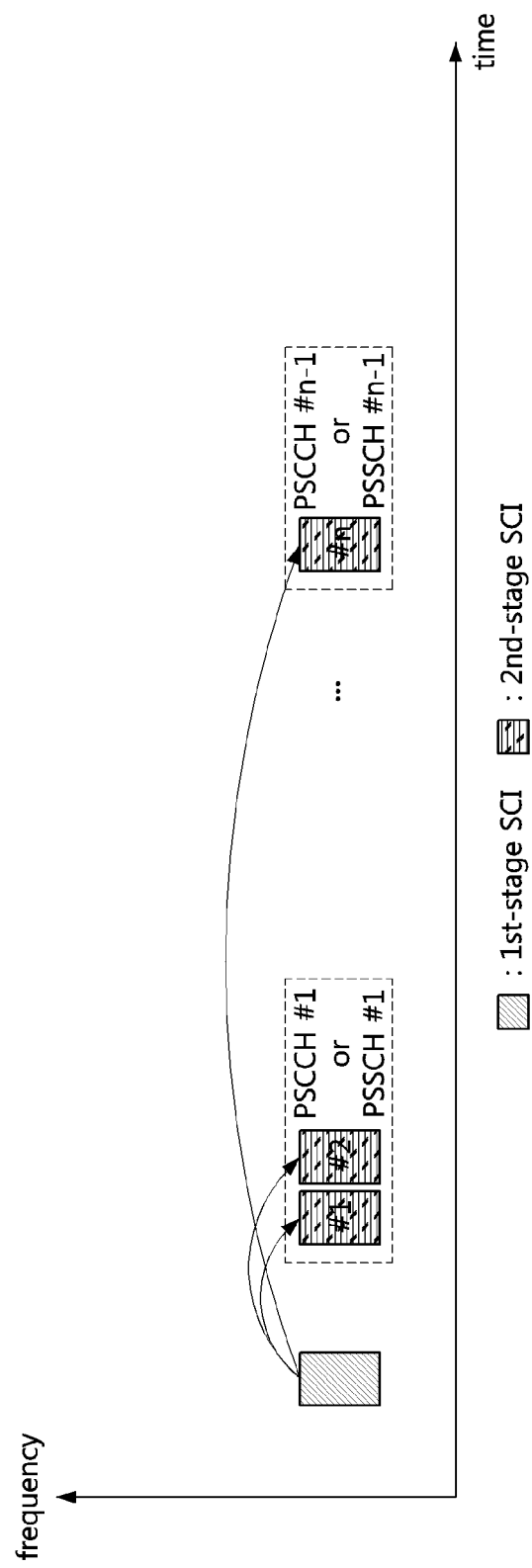
FIG. 11 is a conceptual diagram illustrating a fifth exemplary embodiment of a sidelink communication method.

FIG. 11 is a conceptual diagram illustrating a fifth exemplary embodiment of a sidelink communication method. As shown in FIG. 11, sidelink communication may be performed using one 1st-stage SCI and n 2nd-stage SCIs. The n 2nd-stage SCIs may be indicated by the 1st-stage SCI. The n 2nd-stage SCIs may be transmitted in different time regions (e.g., different slots) within the same frequency region (e.g., the same subchannel or RB set). A plurality of 2nd-stage SCIs among the n 2nd-stage SCIs may be transmitted on the same PSCCH or PSSCH. For example, 2nd-stage SCIs #1 and #2 may be transmitted on a PSCCH #1 or PSSCH #1. In order to support this operation, the 1st-stage SCI may include the information element(s) defined in Table 5. That is, the 1st-stage SCI may further include the information element(s) defined in Table 3 and/or Table 6 as well as the information element(s) defined in Table 5. The multi-PSSCH index (or multi-PSCCH index) included in the 1st-stage SCI may indicate the PSSCH #1 (or PSCCH #1), and the multi-PSSCH index included in the 1st-stage SCI may indicate the 2nd-stage SCIs #1 and #2.

In addition, the 1st-stage SCI may include resource allocation information of PSSCH(s) (e.g., resource allocation information of n PSSCHs). Alternatively, the resource allocation information of PSSCH(s) may be included in then 2nd-stage SCIs instead of the 1st-stage SCI. The resource allocation information included in the 1st-stage SCI and/or n 2nd-stage SCIs may indicate PSSCH(s) on which data is transmitted.

The receiving terminal(s) may be configured to obtain the 1st-stage SCI by performing a monitoring operation (e.g., blind decoding operation) on the PSCCH occasion, and may identify the information element(s) included in the 1st-stage SCI. For example, the receiving terminal(s) may identify resource allocation information (e.g., information element(s) defined in Table 3, Table 5, and/or Table 6) of the n 2nd-stage SCIs included in the 1st-stage SCI. In addition, the receiving terminal(s) may identify resource allocation information of PSSCH(s) (e.g., resource allocation information of n PSSCHs) included in the 1st-stage SCI.

Meanwhile, the transmitting terminal may be configured to generate the n 2nd-stage SCIs, and may be configured to transmit the n 2nd-stage SCIs to the receiving terminal(s). The n 2nd-stage SCIs may be transmitted in resources (e.g., resources within PSCCH(s) or PSSCH(s)) indicated by the resource allocation information included in the 1st-stage SCI. A plurality of 2nd-stage SCIs may be transmitted on the same PSSCH or PSCCH. For example, the transmitting terminal may be configured to transmit 2nd-stage SCIs #1 and #2 on the PSSCH #1 or PSCCH #1. Here, then 2nd-stage SCIs may include resource allocation information of PSSCH(s). In addition, the transmitting terminal may be configured to transmit data to the receiving terminal(s) in resources (e.g., resources within the PSSCH(s)) indicated by the 1st-stage SCI and/or the n 2nd-stage SCIs.

The receiving terminal(s) may be configured to obtain the 2nd-stage SCI(s) in the resources indicated by the 1st-stage SCI. For example, the receiving terminal(s) may be configured to obtain the 2nd-stage SCIs #1 and #2 on the PSSCH #1 or PSCCH #1, and may be configured to obtain a 2nd-stage SCI #n on a PSSCH #n–1 or PSCCH #n–1. The receiving terminal(s) may identify the information element(s) (e.g., resource allocation information of PSSCH(s)) included in the 2nd-stage SCI(s). Since the resources in which the 2nd-stage SCI(s) are transmitted are indicated by the resource allocation information included in the 1st-stage SCI, the receiving terminal(s) may be configured to obtain the 2nd-stage SCI(s) without performing a blind decoding operation. The receiving terminal(s) may be configured to receive data on PSSCH(s) indicated by the resource allocation information included in the 1st-stage SCI and/or the 2nd-stage SCI(s).

Figure 12:
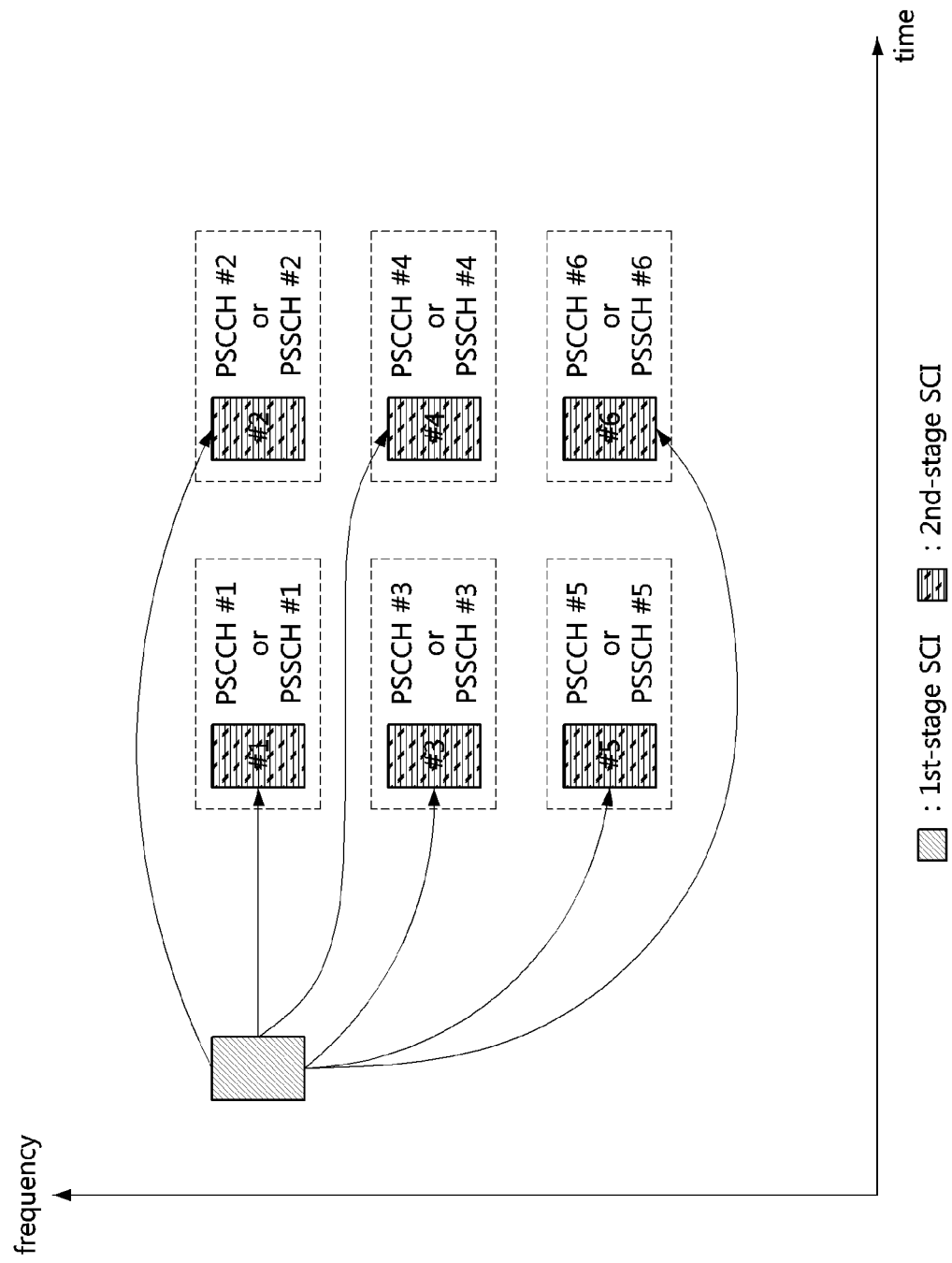
FIG. 12 is a conceptual diagram illustrating a sixth exemplary embodiment of a sidelink communication method.

FIG. 12 is a conceptual diagram illustrating a sixth exemplary embodiment of a sidelink communication method. As shown in FIG. 12, sidelink communication may be performed using one 1st-stage SCI and six 2nd-stage SCIs (i.e., 2nd-stage SCIs #1 to #6). The 2nd-stage SCIs #1 to #6 may be indicated by the 1st-stage SCI. The 2nd-stage SCIs #1 to #6 may be transmitted on different PSSCHs or different PSCCHs. The 1st-stage SCI may include common control information for a plurality of terminals, and the 2nd-stage SCIs #1 to #6 may include dedicated control information for six terminals, respectively. Alternatively, the 1st-stage SCI and the 2nd-stage SCIs #1 to #6 may include control information for one terminal.

The transmitting terminal may be configured to generate the 1st-stage SCI and may be configured to transmit the 1st-stage SCI. The 1st-stage SCI may be transmitted through a PSCCH occasion. The PSCCH occasion may be configured by higher layer signaling. The PSCCH occasion may be configured by cell-specific signaling, resource pool-specific signaling, UE-specific signaling, or SL-specific signaling. The PSCCH occasion may be a resource region in which the SCI (e.g., 1st-stage SCI and/or 2nd-stage SCI) can be transmitted. Thus, the SCI may be transmitted in resources within the PSCCH occasion. Alternatively, the SCI may not be transmitted in resources within the PSCCH occasion.

The 1st-stage SCI may include resource allocation information of the 2nd-stage SCIs #1 to #6. When the 2nd-stage SCIs #1 to #6 are transmitted on PSSCH(s), the resource allocation information included in the 1st-stage SCI may indicate resources in which the 2nd-stage SCIs #1 to #6 are transmitted within the PSSCH(s). Alternatively, when the 2nd-stage SCIs #1 to #6 are transmitted on PSCCH(s), the resource allocation information included in the 1st-stage SCI may indicate resources in which the 2nd-stage SCIs #1 to #6 are transmitted within the PSCCH(s).

For example, the 1st-stage SCI may include resource allocation information #1 of the 2nd-stage SCI #1, resource allocation information #2 of the 2nd-stage SCI #2, resource allocation information #3 of the 2nd-stage SCI #3, resource allocation information #4 of the 2nd-stage SCI #4, resource allocation information #5 of the 2nd-stage SCI #5, and resource allocation information #6 of the 2nd-stage SCI #6. Each of the resource allocation information #1 to #6 may include the information element(s) defined in Table 3. Alternatively, the 1st-stage SCI may include the resource allocation information #1 of the 2nd-stage SCI #1 (e.g., information element(s) defined in Table 3) and information element(s) defined in Table 7 below. The information element(s) defined in Table 7 below may be used to indicate resources of the remaining 2nd-stage SCIs excluding a 2nd-stage SCI #m among the 2nd-stage SCIs #1 to #6. m may be a natural number from 1 to 6.

TABLE 7

| Information element | Description |
| --- | --- |
| Number of frequency-2nd-stage SCIs | The number of 2nd-stage SCIs may indicate the number (e.g., maximum number) of 2nd-stage SCIs in the frequency domain, which is indicated by the 1st-stage SCI. |
| Number of time-2nd-stage SCIs | The number of 2nd-stage SCIs may indicate the number (e.g., maximum number) of 2nd-stage SCIs in the time domain, which is indicated by the 1st-stage SCI. |

TABLE 7-continued

| Information element | Description |
|---|---|
| Frequency interval | The frequency interval may indicate an interval between 2nd-stage SCIs in the frequency domain. |
| Time interval | The time interval may indicate an interval between 2nd-stage SCIs in the time domain. |

The number of frequency-2nd-stage SCIs included in the 1st-stage SCI may be set to 3, and the number of time-2nd-stage SCIs included in the 1st-stage SCI may be set to 2. The resource regions in which the 2nd-stage SCIs #1 to #6 are transmitted may be explicitly or implicitly indicated based on the resource region (e.g., time resource position and/or frequency resource position) in which the 1st-stage SCI is transmitted. Some or all of the resource regions in which the 2nd-stage SCIs #1 to #6 are transmitted may be fixed. In this case, the 2nd-stage SCIs #1 to #6 may be transmitted in preconfigured resource regions, and a transmission operation of the 2nd-stage SCIs #1 to #6 may be performed according to a cell-specific scheme or a resource pool-specific scheme.

In addition, the 1st-stage SCI may include resource allocation information of PSSCH(s) (e.g., resource allocation information of n PSSCHs). Alternatively, the resource allocation information of PSSCH(s) may be included in the 2nd-stage SCIs #1 to #6 instead of the 1st-stage SCI. The resource allocation information included in the 1st-stage SCI and/or the 2nd-stage SCIs #1 to #6 may indicate PSSCH(s) on which data is transmitted.

The receiving terminal(s) may be configured to obtain the 1st-stage SCI by performing a monitoring operation (e.g., blind decoding operation) on the PSCCH occasion, and may identify the information element(s) included in the 1st-stage SCI. For example, the receiving terminal(s) may identify resource allocation information (e.g., information element(s) defined in Table 3 and/or Table 7) of the 2nd-stage SCIs #1 to #6 included in the 1st-stage SCI. In addition, the receiving terminal(s) may identify resource allocation information of PSSCH(s) (e.g., resource allocation information of 6 PSSCHs) included in the 1st-stage SCI.

Meanwhile, the transmitting terminal may be configured to generate the 2nd-stage SCIs #1 to #6, and may be configured to transmit the 2nd-stage SCIs #1 to #6 to the receiving terminal(s). The 2nd-stage SCIs #1 to #6 may be transmitted on different PSCCHs or different PSSCHs. The 2nd-stage SCIs #1 to #6 may be transmitted in resources (e.g., resources within PSCCH(s) or PSSCH(s)) indicated by the resource allocation information included in the 1st-stage SCI. Here, the 2nd-stage SCIs #1 to #6 may include resource allocation information of PSSCH(s). In addition, the transmitting terminal may be configured to transmit data to the receiving terminal(s) in resources (e.g., resources within the PSSCH(s)) indicated by the 1st-stage SCI and/or the 2nd-stage SCIs #1 to #6.

The receiving terminal(s) may be configured to obtain the 2nd-stage SCI(s) in the resources indicated by the 1st-stage SCI, and may identify the information element(s) included in the 2nd-stage SCI(s). For example, the receiving terminal(s) may identify the resource allocation information of PSSCH(s) included in the 2nd-stage SCI(s). Since the resources in which the 2nd-stage SCI(s) are transmitted are indicated by the resource allocation information included in the 1st-stage SCI, the receiving terminal(s) may be configured to obtain the 2nd-stage SCI(s) without performing a blind decoding operation. The receiving terminal(s) may be configured to receive data on the PSSCH(s) indicated by the resource allocation information included in the 1st-stage SCI or the 2nd-stage SCI(s).

Figure 13:
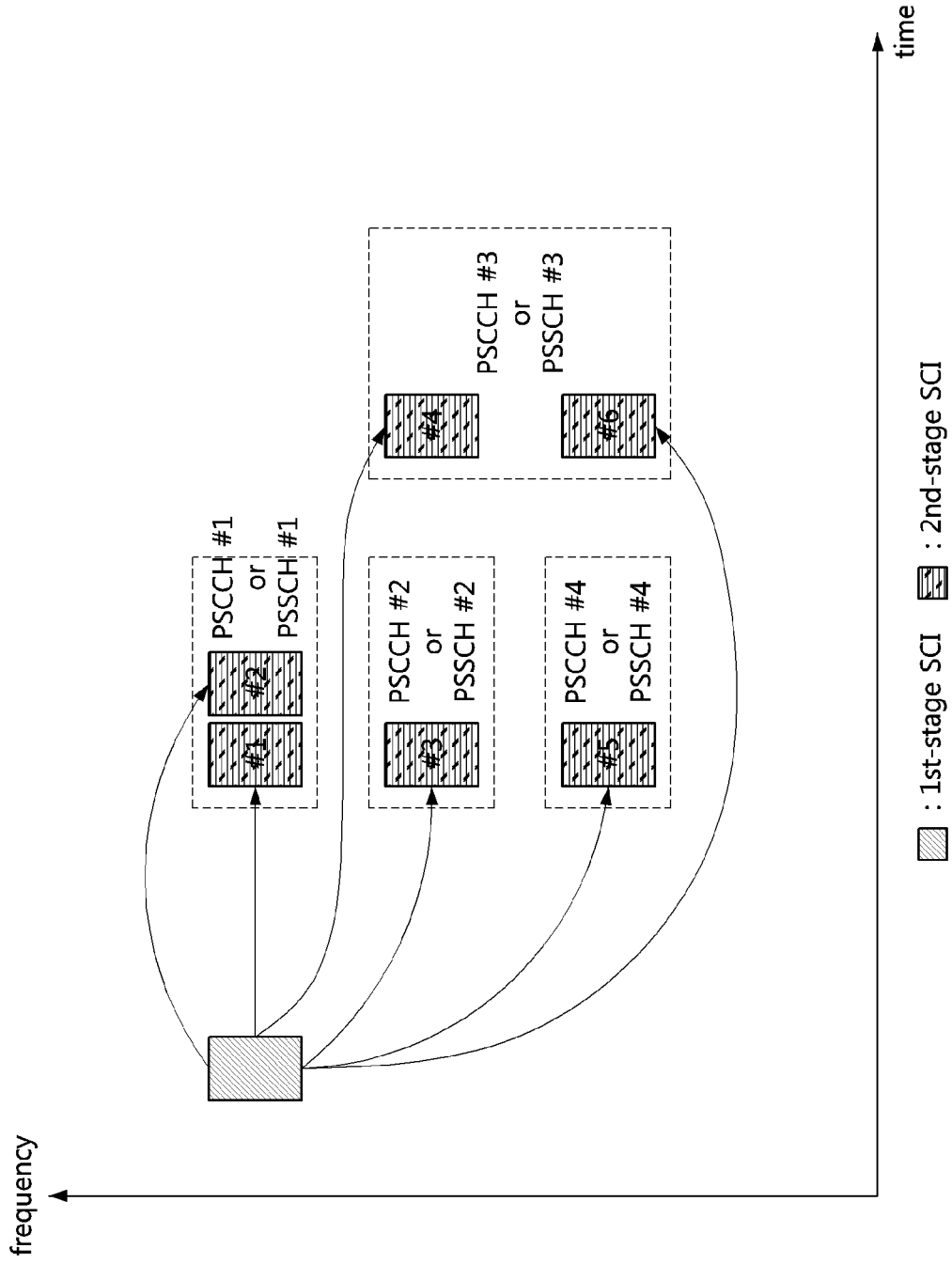
FIG. 13 is a conceptual diagram illustrating a seventh exemplary embodiment of a sidelink communication method.

FIG. 13 is a conceptual diagram illustrating a seventh exemplary embodiment of a sidelink communication method. As shown in FIG. 13, sidelink communication may be performed using one 1st-stage SCI and six 2nd-stage SCIs (i.e., 2nd-stage SCIs #1 to #6). The 2nd-stage SCIs #1 to #6 may be indicated by the 1st-stage SCI. A plurality of 2nd-stage SCIs among the 2nd-stage SCIs #1 to #6 may be transmitted on the same PSCCH or PSSCH. For example, the 2nd-stage SCIs #1 and #2 may be transmitted on a PSCCH #1 or PSSCH #1, and the 2nd-stage SCIs #4 and #6 may be transmitted on a PSCCH #3 or PSSCH #3. In order to support this operation, the 1st-stage SCI may include the information element(s) defined in Table 5. That is, the 1st-stage SCI may further include the information element(s) defined in Table 3 and/or Table 7 as well as the information element(s) defined in Table 5.

The multi-PSCCH index (or multi-PSCCH index) included in the 1st-stage SCI may indicate the PSSCH #1 (or PSCCH #1) and the PSSCH #3 (or PSCCH #3), and the multi-2nd-stage SCI index included in the 1st-stage SCI may indicate the 2nd-stage SCIs #1 and #2 associated with the PSSCH #1 (or PSCCH #1) and the 2nd-stage SCIs #4 and #6 associated with the PSSCH #3 (or PSCCH #3).

In addition, the 1st-stage SCI may include resource allocation information of PSSCH(s) (e.g., resource allocation information of 6 PSSCHs). Alternatively, the resource allocation information of PSSCH(s) may be included in the 2nd-stage SCIs #1 to #6 instead of the 1st-stage SCI. The resource allocation information included in the 1st-stage SCI and/or the 2nd-stage SCIs #1 to #6 may indicate PSSCH(s) on which data is transmitted.

The receiving terminal(s) may be configured to obtain the 1st-stage SCI by performing a monitoring operation (e.g., blind decoding operation) on the PSCCH occasion, and may be configured to identify the information element(s) included in the 1st-stage SCI. For example, the receiving terminal(s) may identify resource allocation information (e.g., information element(s) defined in Table 3, Table 5, and/or Table 7) of the 2nd-stage SCIs #1 to #6 included in the 1st-stage SCI. In addition, the receiving terminal(s) may identify resource allocation information of PSSCH(s) (e.g., resource allocation information of 6 PSSCHs) included in the 1st-stage SCI.

Meanwhile, the transmitting terminal may be configured to generate the 2nd-stage SCIs #1 to #6, and may be configured to transmit the 2nd-stage SCIs #1 to #6 to the receiving terminal(s). The 2nd-stage SCIs #1 to #6 may be transmitted in resources (e.g., resources within PSCCH(s) or PSSCH(s)) indicated by the resource allocation information included in the 1st-stage SCI. A plurality of 2nd-stage SCIs among the 2nd-stage SCIs #1 to #6 may be transmitted on the same PSSCH or PSCCH. For example, the transmitting terminal may transmit the 2nd-stage SCIs #1 and #2 on the PSSCH #1 or PSCCH #1, and may transmit the 2nd-stage SCIs #4 and #6 on the PSSCH #3 or PSCCH #3. Here, the 2nd-stage SCIs #1 to #6 may include resource allocation information of PSSCH(s). In addition, the transmitting terminal may be configured to transmit data to the receiving terminal(s) in the resources (e.g., resources within PSSCH(s)) indicated by the 1st-stage SCI and/or the 2nd-stage SCIs #1 to #6.

The receiving terminal(s) may be configured to obtain the 2nd-stage SCI(s) from the resources indicated by the 1st-stage SCI. For example, the receiving terminal(s) may obtain the 2nd-stage SCIs #1 and #2 on the PSSCH #1 or PSCCH #1, may obtain the 2nd-stage SCI #3 on the PSSCH #2 or PSCCH #2, may obtain the 2nd-stage SCIs #4 and #6 on the PSSCH #3 or PSCCH #3, and may obtain the 2nd-stage SCI #5 on the PSSCH #4 or PSCCH #4. The receiving terminal(s) may be configured to identify information element(s) (e.g., resource allocation information of PSSCH(s)) included in the 2nd-stage SCI(s). Since the resources in which the 2nd-stage SCI(s) are transmitted are indicated by the resource allocation information included in the 1st-stage SCI, the receiving terminal(s) may be configured to obtain the 2nd-stage SCI(s) without performing a blind decoding operation. The receiving terminal(s) may be configured to receive data on the PSSCH(s) indicated by the resource allocation information included in the 1st-stage SCI and/or the 2nd-stage SCI(s).

Meanwhile, in the exemplary embodiments shown in FIGS. 7 to 13, the time-frequency resources of the PSCCH occasions in which the SCIs can be respectively transmitted may be configured to be the same. Alternatively, the time-frequency resources of the PSCCH occasions may be configured to be different from each other. A PSSCH capable of transmitting the 2nd-stage SCI may be referred to as a PSSCH occasion. The time-frequency resources of the PSSCH occasions in which the 2nd-stage SCIs can be respectively transmitted may be configured to be the same. Alternatively, the time-frequency resources of the PSSCH occasions may be configured to be different from each other.

In the exemplary embodiment shown in FIG. 12, when the resources in which the 2nd-stage SCI(s) are transmitted are indicated by the 1st-stage SCI, the 2nd-stage SCIs #1, #3, and #5 may be transmitted in frequency resources at the same position within each PSSCH occasion (or each PSCCH occasion), and the 2nd-stage SCIs #2, #4, and #6 may be transmitted in frequency resources at the same position within each PSSCH occasion (or each PSCCH occasion).

The positions of the frequency resources for transmission of the 2nd-stage SCIs #1, #3, and #5 within each PSSCH occasion (or each PSCCH occasion) may be configured to be the same as the positions of the frequency resources for transmission of the 2nd-stage SCIs #2, #4, and #6. Alternatively, the positions of the frequency resources for transmission of the 2nd-stage SCIs #1, #3, and #5 within each PSSCH occasion (or each PSCCH occasion) may be configured to be different from the positions of the frequency resources for transmission of the 2nd-stage SCIs #2, #4, and #6.

The positions of the frequency resources for the 2nd-stage SCIs transmitted in the same time region (e.g., the positions of the frequency resources within each PSSCH occasion or each PSCCH occasion) may be configured to be the same. Alternatively, the positions of the time resources for the 2nd-stage SCIs transmitted in the same frequency region (e.g., the positions of the time resources within each PSSCH occasion or each PSCCH occasion) may be configured to be the same. Alternatively, all of the positions of the resources in which the 2nd-stage SCIs are transmitted may be configured to be different from each other.

In the above-described exemplary embodiments, a time-domain resource allocation unit of the time region (e.g., PSCCH and/or PSSCH) may be a slot. The time resource(s) in which the 2nd-stage SCI is transmitted may be x symbols from the first symbol within the PSSCH (or, PSCCH or resource pool). x may mean the number of symbols defined in Table 3. x may be indicated by one or a combination of two or more of higher layer signaling, MAC signaling, and PHY signaling. In the exemplary embodiment shown in FIG. 12, the time resources in which the 2nd-stage SCI is transmitted may be indicated by the number of symbols and/or symbol index(es), and the frequency resources in which the 2nd-stage SCI is transmitted may be indicated by the number of PRBs, PRB index(es), the number of REs, and/or RE index(es).

Figure 14:
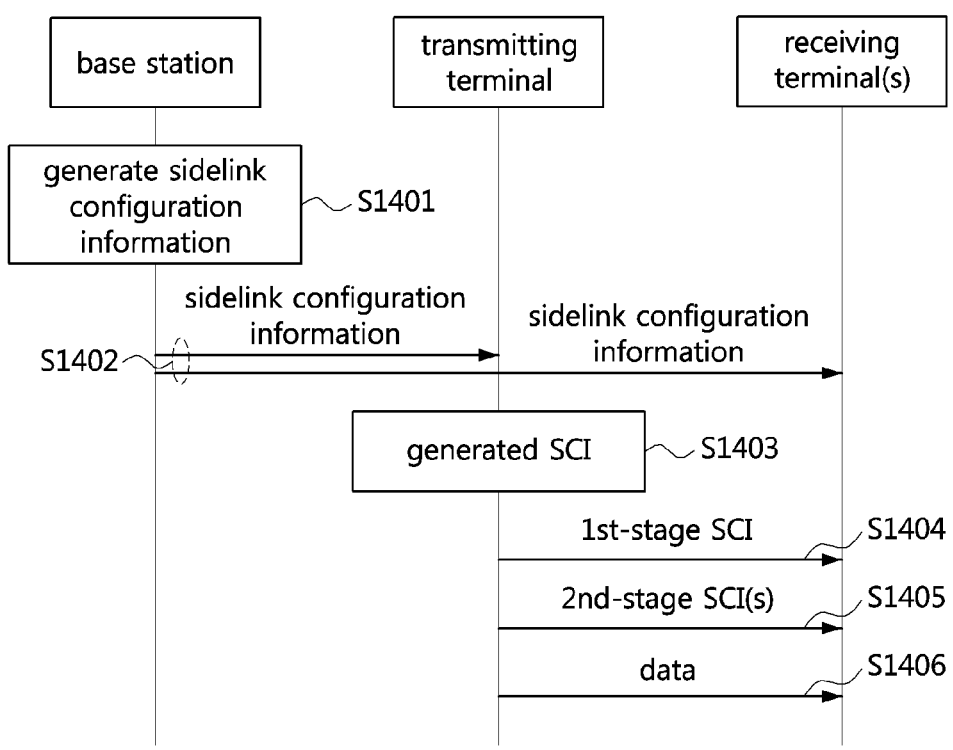
FIG. 14 is a sequence chart illustrating a first exemplary embodiment of a sidelink communication method using a plurality of SCIs.

FIG. 14 is a sequence chart illustrating a first exemplary embodiment of a sidelink communication method using a plurality of SCIs. As shown in FIG. 14, a communication system may include a base station, a transmitting terminal, and a receiving terminal(s). The base station may be the base station 210 shown in FIG. 2, the transmitting terminal may be the UE 235 shown in FIG. 2, and the receiving terminal may be the UE 236 shown in FIG. 2. The transmitting terminal and/or the receiving terminal may be located within the coverage of the base station. Alternatively, the transmitting terminal and/or the receiving terminal may be located outside the coverage of the base station. Each of the base station, the transmitting terminal, and the receiving terminal may be configured identically or similarly to the communication node 300 shown in FIG. 3. The transmitting terminal and/or the receiving terminal may support the protocol stacks shown in FIGS. 4 to 6.

The base station may be configured to generate sidelink configuration information (S140). The sidelink configuration information may include SL-PSCCH configuration information (e.g., sl-PSCCH-Config) and SL-PSSCH configuration information (e.g., sl-PSSCH-Config). The SL-PSCCH configuration information may include information element(s) indicating resources (e.g., PSCCH occasion) in which the 1st-stage SCI is transmitted. The SL-PSSCH configuration information may include information element(s) indicating resources (e.g., PSSCH occasion) in which the 2nd-stage SCI is transmitted. When the 2nd-stage SCI is transmitted on a PSCCH, the SL-PSCCH configuration information may further include information element(s) indicating resources (e.g., PSCCH occasion) in which the 2nd-stage SCI is transmitted.

The sidelink configuration information (e.g., SL-PSSCH configuration information) may include configuration information of candidate resources in which the 2nd-stage SCI is transmitted. For example, the sidelink configuration information may include configuration information of candidate resources #1 to #4 defined in Table 8 below. Although four candidate resources are defined in Table 8 below, various numbers of candidate resources may be defined.

TABLE 8

|  | Time resource | Frequency resource |
|---|---|---|
| Candidate resource #1 | First symbol | PRB index(es) or RE index(es) (e.g., PRB(s) or RE(s) mapped from the highest frequency resource) |
| Candidate resource #2 | First symbol | PRB index(es) or RE index(es) (e.g., PRB(s) or RE(s) mapped from the highest frequency resource) |
| Candidate resource #3 | First symbol and second symbol | PRB index(es) or RE index(es) (e.g., PRB(s) or RE(s) mapped from the lowest frequency resource) |
| Candidate resource #4 | First symbol and second symbol | PRB index(es) or RE index(es) (e.g., PRB(s) or RE(s) mapped from the lowest frequency resource) |

The candidate resources defined in Table 8 may be indicated by cell-specific signaling, resource pool-specific signaling, UE-specific signaling, or SL-specific signaling. In Table 8, the time resource may be indicated by the number of symbols and/or the time offset defined in Table 3. That is, each of the candidate resources #1 to #4 may be indicated by the number of symbols and/or the time offset defined in Table 3. In Table 8, the frequency resource may be indicated by the number of REs and/or the frequency offset (or the number of PRBs and/or frequency offset) defined in Table 3. That is, each of the candidate resources #1 to #4 may be indicated by the number of REs and/or the frequency offset defined in Table 3. When the sidelink configuration information includes configuration information of the candidate resources #1 to #4 defined in Table 8, one candidate resource among the candidate resources #1 to #4 may be indicated by an information element (e.g., indicator having a size of 2 bits), and the 2nd-stage SCI may be transmitted in the candidate resource indicated by the 1st-stage SCI.

Alternatively, the sidelink configuration information may include information on resources in which the 2nd-stage SCI is actually transmitted. In this case, the sidelink configuration information may include the information element(s) defined in Table 3 instead of the configuration information of the candidate resources #1 to #4 defined in Table 8. In this case, the 2nd-stage SCI may be transmitted in the resources indicated by the sidelink configuration information.

In addition, the sidelink configuration information may further include information element(s) defined in Tables 4 to 7 as well as the configuration information of the information element(s) defined in Table 3 or the candidate resource(s) defined in Table 8.

The base station may be configured to transmit a higher layer message including the sidelink configuration information (S1402). The sidelink configuration information may be transmitted through one or a combination of two or more of a higher layer message, a MAC message, and a PHY message. The terminals (e.g., the transmitting terminal and/or the receiving terminal(s)) may be configured to receive the sidelink configuration information from the base station, and may be configured to identify the information element(s) included in the sidelink configuration information. The terminals may identify the SL-PSCCH configuration information and/or the SL-PSSCH configuration information. For example, the terminals may identify the information element(s) defined in Table 3 or the configuration information of the candidate resource(s) defined in Table 8. Additionally, the terminals may identify the information element(s) defined in Tables 4 to 7.

When there is data (e.g., sidelink data) to be transmitted from the transmitting terminal to the receiving terminal(s), the transmitting terminal may be configured to generate an SCI including scheduling information (e.g., resource allocation information) of the data (S1403). The SCI may include a 1st-stage SCI and 2nd-stage SCI(s). The 1st-stage SCI may include scheduling information of the data and resource allocation information of the 2nd-stage SCI(s). Alternatively, the scheduling information of the data may be included in the 2nd-stage SCI instead of the 1st-stage SCI. When the candidate resources defined in Table 8 are configured by higher layer signaling, the 1st-stage SCI may include an information element indicating one candidate resource among the candidate resources configured by higher layer signaling. When the 1st-stage SCI indicates a plurality of 2nd-stage SCIs, the 1st-stage SCI may include information indicating a candidate resource for each of the plurality of 2nd-stage SCIs or one candidate resource for the plurality of 2nd-stage SCIs.

When the information element(s) defined in Table 3 are not indicated by higher layer signaling, the 1st-stage SCI may include information element(s) defined in Table 3 (e.g., information element(s) not indicated by higher layer signaling). In addition, when the information element(s) defined in Tables 4 to 7 are not indicated by higher layer signaling, the 1st-stage SCI may include information element(s) defined in Tables 4 to 7 (e.g., information element(s) not indicated by higher layer signaling).

The transmitting terminal may be configured to transmit the 1st-stage SCI to the receiving terminal(s) (S1404). The transmitting terminal may be configured to transmit the 2nd-stage SCI(s) to the receiving terminal(s) in the resources indicated by the 1st-stage SCI (S1405). When the 1st-stage SCI and the plurality of 2nd-stage SCIs are used, the 1st-stage SCI may include common control information for a plurality of receiving terminals, and the plurality of 2nd-stage SCIs may include dedicated control information for a plurality of receiving terminals, respectively. In this case, the 1st-stage SCI and the plurality of 2nd-stage SCIs may be transmitted to the plurality of receiving terminals. Alternatively, the 1st-stage SCI and the plurality of 2nd-stage SCIs may include control information for one receiving terminal. In this case, the 1st-stage SCI and the plurality of 2nd-stage SCIs may be transmitted to the one receiving terminal.

The receiving terminal(s) may be configured to receive the 1st-stage SCI from the transmitting terminal by performing a monitoring operation (e.g., blind decoding operation) on the PSCCH occasion, and may be configured to obtain resource allocation information of the 2nd-stage SCI(s) included in the 1st-stage SCI. The receiving terminal(s) may be configured to receive the 2nd-stage SCI(s) in the resources indicated by the 1st-stage SCI. The 2nd-stage SCI(s) may be obtained without performing a blind decoding operation.

The transmitting terminal may be configured to transmit data to the receiving terminal(s) in the resources (e.g., PSSCH(s)) indicated by the 1st-stage SCI and/or the 2nd-stage SCI(s) (S1406). The receiving terminal(s) may be configured to receive the data from the transmitting terminal in the resources (e.g., PSSCH(s)) indicated by the 1st-stage SCI and/or the 2nd-stage SCI(s).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. A method of operating a transmitting terminal in a communication system, the operation method comprising:

generating a 1st-stage sidelink control information (SCI) including resource allocation information of m 2nd-stage SCIs;

transmitting the 1st-stage SCI to one or more receiving terminals; and transmitting the m 2nd-stage SCIs to the one or more receiving terminals in resource region(s) indicated by the resource allocation information, wherein m is a natural number that is set in a resource pool-specific manner through a higher layer message from a base station, wherein the resource allocation information includes time resource information and frequency resource information for each of the m 2nd-stage SCIs, and wherein the m 2nd-stage SCIs are transmitted on different physical sidelink shared channels (PSSCHs).

2. The method according to claim 1, further comprising receiving, from a base station, a message including configuration information of candidate resources capable of transmitting the m 2nd-stage SCIs, wherein the resource region(s) indicated by the resource allocation information is one candidate resource among the candidate resources.

3. The method according to claim 1, wherein the time resource information indicates at least one of a start symbol index, a number of symbols, or slot index(es), and the frequency resource information indicates at least one of a start resource element (RE) index, a number of REs, or subchannel index(es).

4. The method according to claim 1, wherein the resource allocation information includes information indicating a time resource and a frequency resource of a 2nd-stage SCI #n among the m 2nd-stage SCIs, a time interval between the m 2nd-stage SCIs, a frequency interval between the m 2nd-stage SCIs, or combinations thereof, and n is a natural number.

5. The method according to claim 4, wherein the time interval is a time-domain interval between the time resource of the 2nd-stage SCI #n and a time resource of a 2nd-stage SCI #n+1 among the m 2nd-stage SCIs, and the frequency interval is a frequency-domain interval between the frequency resource of the 2nd-stage SCI #n and a frequency resource of the 2nd-stage SCI #n+1.

6. The method according to claim 1, wherein the 1st-stage SCI includes common control information for the one or more receiving terminals, and the m 2nd-stage SCIs include dedicated control information for the one or more receiving terminals, respectively.

7. The method according to claim 1, wherein the m 2nd-stage SCIs are multiplexed in at least one of a time domain and a frequency domain.

8. A method of operating a receiving terminal in a communication system, the operation method comprising:

receiving a 1st-stage sidelink control information (SCI) from a transmitting terminal;

obtaining resource allocation information of a m 2nd-stage SCIs included in the 1st-stage SCI; and receiving the m 2nd-stage SCIs from the transmitting terminal in resource region(s) indicated by the resource allocation information, wherein m is a natural number that is set in a resource pool-specific manner through a higher layer message from a base station, wherein the resource allocation information includes time resource information and frequency resource information for each of the m 2nd-stage SCIs, and wherein the m 2nd-stage SCIs are received on different physical sidelink shared channels (PSSCHs).

9. The method according to claim 8, further comprising receiving, from a base station, a message including configuration information of candidate resources capable of transmitting the m 2nd-stage SCIs, wherein the resource region(s) indicated by the resource allocation information is one candidate resource among the candidate resources.

10. The method according to claim 8, wherein the 1st-stage SCI is obtained by performing a blind decoding operation, and the m 2nd-stage SCIs are obtained without performing a blind decoding operation.

11. The method according to claim 8, wherein the time resource information indicates at least one of a start symbol index, a number of symbols, or slot index(es), and the frequency resource information indicates at least one of a start resource element (RE) index, a number of REs, or subchannel index(es).

12. The method according to claim 8, wherein the resource allocation information includes information indicating a time resource and a frequency resource of a 2nd-stage SCI #n among the m 2nd-stage SCIs, a time interval between the m 2nd-stage SCIs, a frequency interval between the m 2nd-stage SCIs, or combinations thereof, and n is a natural number.

13. The method according to claim 12, wherein the time interval is a time-domain interval between the time resource of the 2nd-stage SCI #n and a time resource of a 2nd-stage SCI #n+1 among the m 2nd-stage SCIs, and the frequency interval is a frequency-domain interval between the frequency resource of the 2nd-stage SCI #n and a frequency resource of the 2nd-stage SCI #n+1.

14. A method of operating a transmitting terminal in a communication system, the operation method comprising:

receiving, from a base station, a message including sidelink (SL)-physical sidelink control channel (PSCCH) configuration information and SL-physical sidelink shared channel (PSSCH) configuration information;

transmitting a 1st-stage sidelink control information (SCI) to a receiving terminal on a PSCCH indicated by the SL-PSCCH configuration information;

transmitting a m 2nd-stage SCIs to the receiving terminal on PSSCH(s) indicated by the SL-PSSCH configuration information; and transmitting data to the receiving terminal based on information elements included in the 1st-stage SCI and the m 2nd-stage SCIs, wherein m is a natural number that is set in a resource pool-specific manner through a higher layer message from a base station, wherein the SL-PSSCH configuration information includes time resource information and frequency resource information for each of the m 2nd-stage SCIs, and wherein the m 2nd-stage SCIs are transmitted on different physical PSSCHs.

15. The method according to claim 14, wherein the time resource information indicates at least one of a start symbol index, a number of symbols, or slot index(es), and the frequency resource information indicates at least one of a start resource element (RE) index, a number of REs, or subchannel index(es).

16. The method according to claim 14, wherein:

the SL-PSSCH configuration information includes information indicating a time resource and a frequency resource of a 2nd-stage SCI #n among the m 2nd-stage SCIs, a time interval between the m 2nd-stage SCIs, a frequency interval between the m 2nd-stage SCIs, or combinations thereof, and the time interval is a time-domain interval between the time resource of the 2nd-stage SCI #n and a time resource of a 2nd-stage SCI #n+1 among the m 2nd-stage SCIs, and the frequency interval is a frequency-domain interval between the frequency resource of the 2nd-stage SCI #n and a frequency resource of the 2nd-stage SCI #n+1.

17. The method according to claim 14, wherein the SL-PSSCH configuration information includes configuration information of candidate resources capable of transmitting the m 2nd-stage SCIs, and the 1st-stage SCI includes information indicating one candidate resource among the candidate resources.

* * * * *